United States Patent
Chu et al.

(10) Patent No.: US 9,915,977 B1
(45) Date of Patent: Mar. 13, 2018

(54) DOCKING STATION FOR A MOBILE ELECTRONIC DEVICE AND OPERATING METHOD FOR THE SAME

(71) Applicant: USI ELECTRONICS (SHENZHEN) CO., LTD., Nanshan District, Shenzhen (CN)

(72) Inventors: Yu-Chen Chu, Nantou County (TW); Kuo-Kuang Liu, Nantou County (TW); Ming-Jen Chen, Nantou County (TW); Chang-Cheng Lin, Nantou County (TW)

(73) Assignee: USI ELECTRONICS (SHENZHEN) CO., LTD., Nanshan District, Shenzhen (CN)

( * ) Notice: Subject to any disclaimer, the term of this patent is extended or adjusted under 35 U.S.C. 154(b) by 0 days.

(21) Appl. No.: 15/401,485

(22) Filed: Jan. 9, 2017

(30) Foreign Application Priority Data

Sep. 14, 2016 (CN) .......................... 2016 1 0822877

(51) Int. Cl.
*G06F 1/16* (2006.01)
(52) U.S. Cl.
CPC .................................. *G06F 1/1632* (2013.01)
(58) Field of Classification Search
CPC .................................................... G06F 1/1632
See application file for complete search history.

(56) References Cited

U.S. PATENT DOCUMENTS

| | | | | |
|---|---|---|---|---|
| 6,069,790 A * | 5/2000 | Howell | ................. | G06F 1/1632 |
| | | | | 292/122 |
| 7,381,079 B2 * | 6/2008 | Chuang | ................. | G06F 1/1632 |
| | | | | 361/679.41 |
| 7,633,750 B2 * | 12/2009 | Fan | ........................ | G06F 1/1632 |
| | | | | 361/679.41 |
| 8,792,234 B2 * | 7/2014 | Carnevali | ............. | G06F 1/1632 |
| | | | | 361/679.41 |
| 9,003,626 B2 * | 4/2015 | Carnevali | ............. | G06F 1/1632 |
| | | | | 248/316.4 |
| 9,326,397 B2 * | 4/2016 | Yamazaki | ............ | H05K 5/0208 |
| 2004/0223293 A1 * | 11/2004 | Nakano | ................. | G06F 1/1632 |
| | | | | 361/679.43 |
| 2006/0082965 A1 * | 4/2006 | Walker | ................ | E05B 73/0082 |
| | | | | 361/679.41 |

(Continued)

*Primary Examiner* — Hoa C Nguyen
*Assistant Examiner* — Keith Depew
(74) *Attorney, Agent, or Firm* — Muncy, Geissler, Olds & Lowe, P.C.

(57) ABSTRACT

A docking station for a mobile electronic device is provided. It utilizes a transmission unit and a release unit to control the positioning of a connection unit. The transmission unit includes a horizontal displacement member abutted against a floating cover for horizontal displacement upon a downward movement of the floating cover, and a pivot member mounted at the connection unit and connected to the horizontal displacement member, so that the connection unit can connect the mobile electronic device upon a downward movement of the floating cover. The release unit includes a swing arm connected with the pivot member and a button abutted against the swing arm. When the button is pressed, the swing arm is pushed to drive the connection unit to disengage from the mobile electronic device via the pivot member. Thus, the mobile electronic device can be removed.

6 Claims, 9 Drawing Sheets

(56) References Cited

U.S. PATENT DOCUMENTS

| | | | | |
|---|---|---|---|---|
| 2006/0092605 A1* | 5/2006 | DeLuga | ............... | G06F 1/1632 361/679.58 |
| 2006/0139875 A1* | 6/2006 | Cheng | ................. | G06F 1/1632 361/679.57 |
| 2007/0115628 A1* | 5/2007 | Jiang | .................... | G06F 1/1632 361/679.01 |
| 2007/0297130 A1* | 12/2007 | Fan | ..................... | G06F 1/1632 361/679.44 |
| 2012/0218722 A1* | 8/2012 | Yu | ....................... | F16M 11/041 361/747 |
| 2014/0347815 A1* | 11/2014 | Yamazaki | ........... | H05K 5/0208 361/679.57 |
| 2015/0268695 A1* | 9/2015 | Chen | ................... | G06F 1/1632 361/679.41 |

\* cited by examiner

DOCKING STATION FOR A MOBILE ELECTRONIC DEVICE AND OPERATING METHOD FOR THE SAME

BACKGROUND OF THE INVENTION

1. Field of the Invention

The present invention relates to docking station, and more particularly, to a docking station for a mobile electronic device for user-friendly operation. The invention relates also to a method for operating the docking station.

2. Description of the Related Art

With the development of technology, the creation of mobile electronic device (such as notebook computer) brings great convenience to human's life, and it becomes indispensable paraphernalia. In order to facilitate a user carrying the mobile electronic device, the common method adopted nowadays is to remove some functional modules of the mobile electronic device (such as CD-ROM) or to reduce the number of connection ports so as to achieve the effect of reduced size and weight, in addition, a corresponding docking station is provided for allowing user to choose the desired expansion functions.

On the conventional technology, a docking station uses a laterally retractable connection unit for connection to a mating connection port of the mobile electronic device. When the user is going to install the mobile electronic device on the docking station, push back the connection unit of the docking station by hand, and then place the mobile electronic device on the docking station, and then manually plug the connection unit into the mating connection port of the mobile electronic device to complete connection between the mobile electronic device and the docking station. If the user wants to take the mobile electronic device from the docking station, the user needs to push the connection unit backwardly by hand so as to release the connection relationship between the docking station and the mobile electronic device, allowing removal of the mobile electronic device from the docking station. According to the aforesaid prior art technique, the user needs to achieve connection or disconnection between the mobile electronic device and the docking station manually. For the user, the entire operation process is troublesome and not human-friendly.

SUMMARY OF THE INVENTION

The present invention has been accomplished under the circumstances in view. It is an object of the present invention to provide a docking station for a mobile electronic device, which makes the connection between the docking station and the mobile electronic device more user-friendly and enhances the convenience in operation.

To achieve this and other objects of the present invention, a docking station is provided to comprise a base, a floating cover, a connection unit, a transmission unit and a release unit. The floating cover is mounted on the base and movable up and down relative to the base. The connection unit is horizontally movably mounted at the base and located at one lateral side relative to the floating cover. The transmission unit comprises a horizontal displacement member, a first return spring, a pivot member and a second return spring. The horizontal displacement member is horizontally movably mounted at the base and abutted against a bottom wall of the floating cover, and the horizontal displacement member is displaced horizontally by exerting a downward pressure on the floating cover. The first return spring has two opposite ends thereof respectively connected to the base and the horizontal displacement member for providing an elastic restoring force to the horizontal displacement member. The pivot member is pivotally mounted at the connection unit and detachably engaged with the horizontal displacement member for carrying the connection unit to move upon displacement of the horizontal displacement member. The second return spring has two opposite ends thereof respectively connected to the connection unit and the pivot member for providing an elastic restoring force to the pivot member. The release unit comprises a swing arm, a button and a third return spring. The swing arm is connected to the pivot member, having one end thereof pivotally coupled to the base. The button is mounted at the base and abutted against another end of the swing arm. When the button is pressed by an external force, the swing arm is pushed in moving and disengages the pivot member away from the horizontal displacement member. The pivot member will drive the connection unit to disconnect the mobile electronic device. The third return spring is mounted between the base and the button and adapted for providing an elastic restoring force to the button.

Thus, when the user places the mobile electronic device on the floating cover and it presses the floating cover downward, the connection unit will extend out and plug into the mobile electronic device. When the user wants to remove the mobile electronic device from the docking station, the user presses the button first to release the connection relationship between the connection unit and the mobile electronic device, and then the user can take the mobile electronic device out of the floating cover. Upon the user removes the mobile electronic device and further release the button, the horizontal displacement member will be pushed back into the original engagement with the pivot member by the elastic restoring force of the first return spring.

In the present invention, the horizontal displacement member comprises a first upright wall located at one end thereof and the pivot member comprises a first hook portion located at one end thereof. When the pivot member is disposed in an engagement position, the first hook portion of the pivot member is engaged with the first upright wall of the horizontal displacement member. When the pivot member is disposed in a disengagement position, the first hook portion of the pivot member is disengaged from the first upright wall of the horizontal displacement member.

In the present invention, the swing arm comprises a second upright wall. The pivot member comprises a second hook portion located at one end thereof and engaged with the second upright wall of the swing arm, so that the swing arm can carry the pivot member to bias when it is driven by the button.

In the present invention, the swing arm has one end thereof pivotally connected to the base, and an opposite end thereof provided with a bearing portion. The button comprises a protruding portion located at a bottom side thereof. The release unit further comprises a biasing member pivotally mounted at the base. The biasing member of the release unit comprises a first extension portion abutted against the protruding portion of the button, and a second extension portion connected with the bearing portion of the swing arm. Thus, when the button is pressed by an external force, the biasing member is forced by the button to bias and to further drive the swing arm to move the pivot member.

In the present invention, the connection unit comprises a push-on seat movably mounted in the base, a terminal block having a bottom side thereof mounted on the push-on seat, and a connection terminal mounted on a top side of the terminal block. The pivot member has a middle part thereof pivotally connected to the push-on seat. The two ends of the second return spring are connected to the push-on seat and the pivot member. Thus, by means of the push-on seat, the connection unit is movable.

Other and further benefits, advantages and features of the present invention will be understood by reference to the following specification in conjunction with the accompanying drawings, in which like reference characters denote like elements of structure.

DETAILED DESCRIPTION OF THE INVENTION

The terminology used in the description of the present invention is intended to be illustrative in the art to which the ordinarily skilled artisan can understand. The various terms used in the specification are simply for describing a particular embodiment of the present invention but not intended to limit the scope of the present invention. The quantifiers used in the claims of the present invention all include the meanings of the plural, for example, "one component" refers to one or more components and includes equivalents that are obvious to a person having ordinary skill in the art. All conjunctions used under similar conditions should also be understood as having the broadest meaning. Further, the particular shapes, cross-sections, and structural features or technical terms described in the specification are to be construed to include equivalent alternative constructions or technical teams for the functions that may be achieved by a particular structure or technical term.

The technical content and features of the prevent invention will now be fully understood by way of an example with reference to the annexed drawings. First of all, it is to be noted that the present invention can be applied to various mobile electronic devices, such as notebook computer, tablet computer or mobile phone, therefore, the scope of the claims is not limited to the description in the specification. Further, the direction terms of "front", "upward", "downward", "back", "top", "bottom", "clockwise" and "counter-clockwise" described in the specification are based on the normal usage but not intended to limit the scope of the invention.

Figure 1:
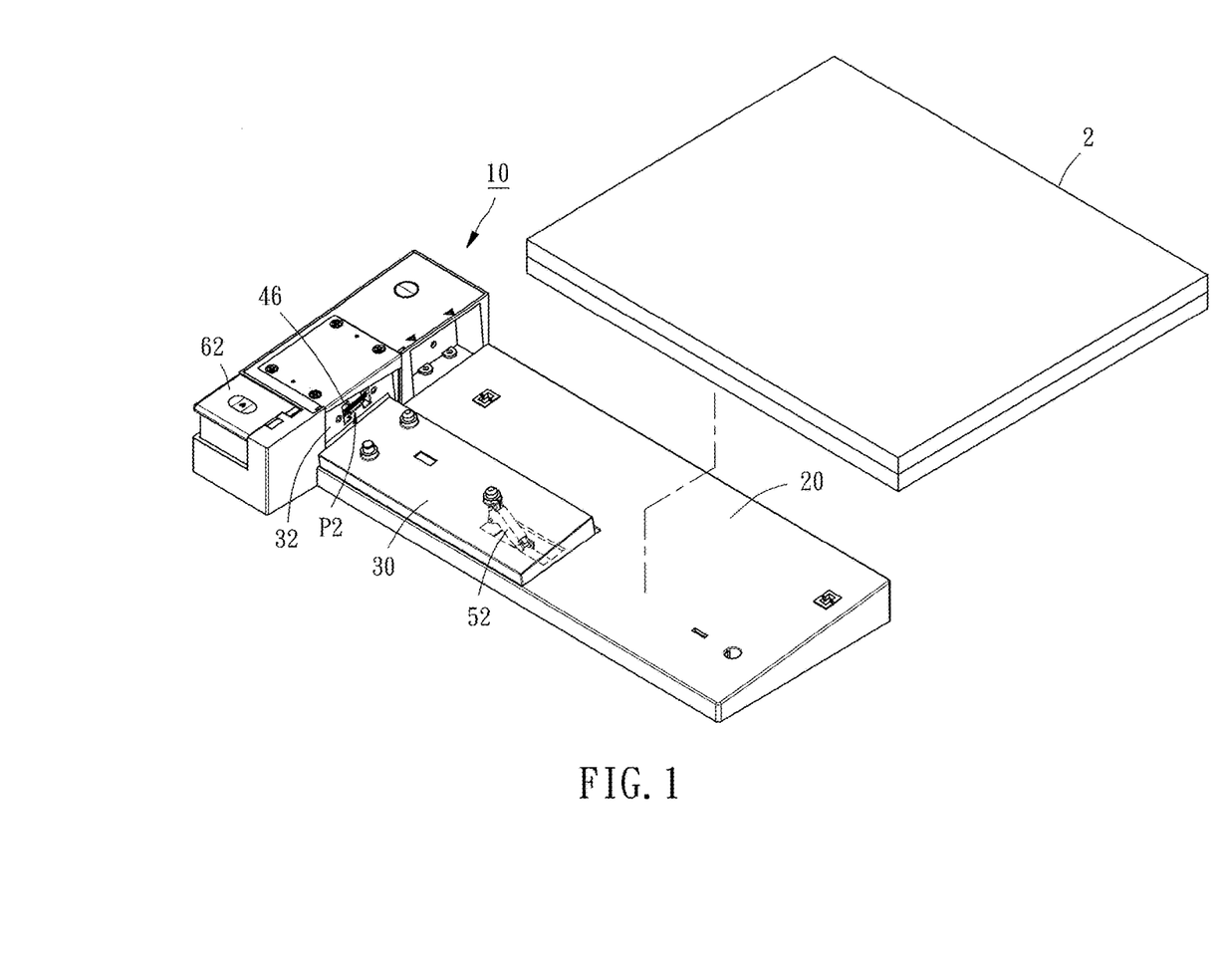
FIG. 1 is a perspective view of the present invention, mainly illustrating that the connection unit is in the release position.
Figure 2:
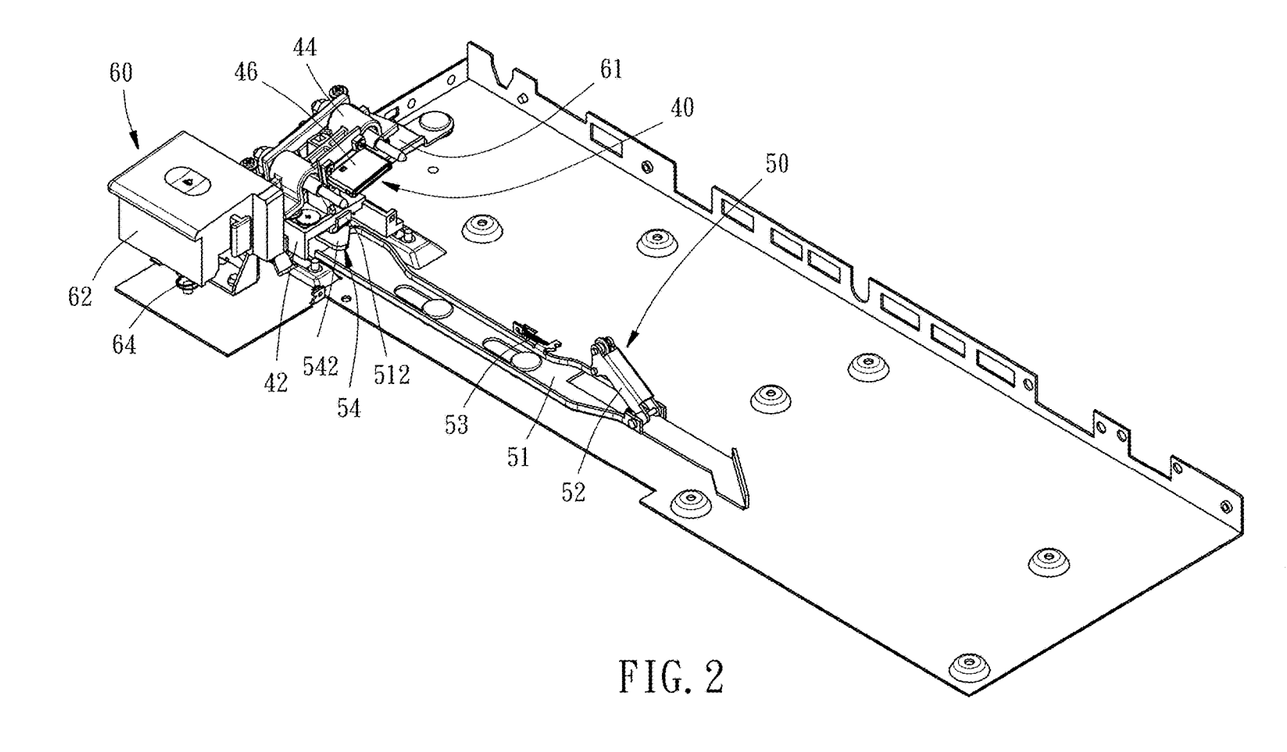
FIG. 2 is a perspective view illustrating the internal structure of the docking station after removal of the upper part of the base.

Referring to FIG. 1 and FIG. 2, a docking station 10 in accordance with the present invention is shown. The docking station 10 comprises a base 20, a floating cover 30, a connection unit 40, a transmission unit 50, and a release unit 60.

The base 20 is used to be placed on a tabletop as a support.

The floating cover 30 is mounted on the base 20 and movable up and down relative to the base 20 for bearing a mobile electronic device 2.

The connection unit 40 is disposed at one lateral side relative to the floating cover 30, comprising a push-on seat 42, a terminal block 44, and a connection terminal 46. The push-on seat 42 is horizontally movably mounted in the base 20. The terminal block 44 has a bottom side thereof affixed to the push-on seat 42. The connection terminal 46 fixedly mounted at a top side of the terminal block 44. Thus, the connection terminal 46 is movable with the push-on seat 42 horizontally between a connection position P1 (see FIG. 6) and a release position P2 (see FIG. 1). When the connection unit 40 is in the connection position P1 shown in FIG. 6, the connection terminal 46 is pushed out of one lateral wall 32 of the floating cover 30 and plugged into the mobile electronic device 2 to make the connection unit 40 electrically connect the mobile electronic device 2. When the connection unit 40 is in the release position P2 shown in FIG. 1, the connection terminal 46 is retracted back inside the lateral wall 32 of the floating cover 30 and disconnected from the mobile electronic device 2, releasing the connection between the connection unit 40 and the mobile electronic device 2.

Figure 3:
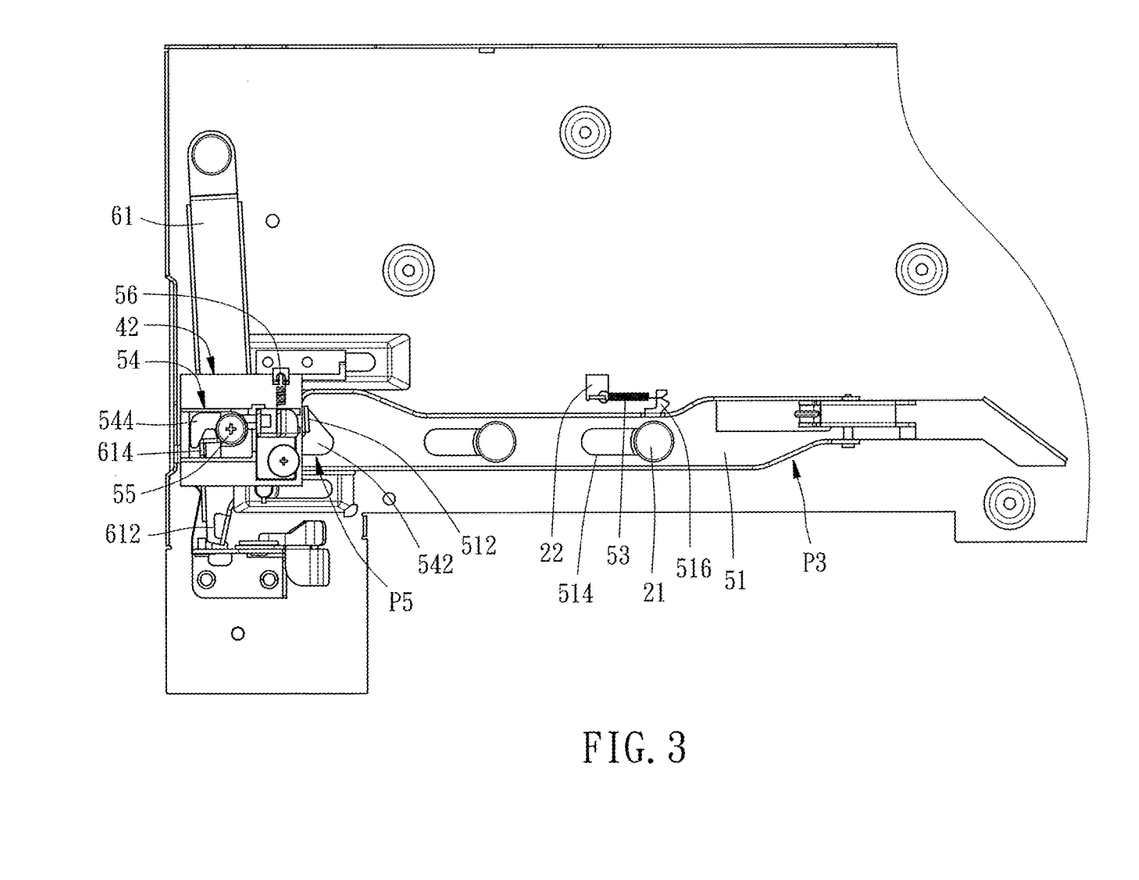
FIG. 3 is a schematic top view illustrating the horizontal displacement member in the initial position and the pivot member in the engagement position without the presence of the connection terminal.

As illustrated in FIGS. 2 and 3, the transmission unit 50 comprises a horizontal displacement member 51, a first return spring 53, a pivot member 54, and a second return spring 56.

The horizontal displacement member 51 is horizontally reciprocatably mounted in the base 20, comprising a first upright wall 512 located at one end thereof adjacent to the connection unit 40. The horizontal displacement member 51 comprises an opposite end thereof remote from the connection unit 40 which is stopped against a bottom side of the floating cover 30 by a push rod 52 (see FIG. 1 and FIG. 6). Thus, by means of pressing the floating cover 30, the horizontal displacement member 51 can be moved from an initial position P3 (see FIG. 3) in direction away from the connection unit 40 to an end position P4 (see FIG. 5). The horizontal displacement member 51 further comprises two position-limiting sliding slots 514 which are spacedly arranged and respectively coupled to a respective position-limiting guide rod 21 of the base 20 so that the horizontal displacement member 51 is constrained to move between the initial position P3 and the end position P4.

The first return spring 53 (see the tension spring shown in FIG. 2), having two opposite ends thereof respectively connected to a first locating portion 22 of the base 20 and a second locating portion 516 of the horizontal displacement member 51 to provide an elastic restoring force that pulls the horizontal displacement member 51 in direction toward the initial position P3.

Figure 8:
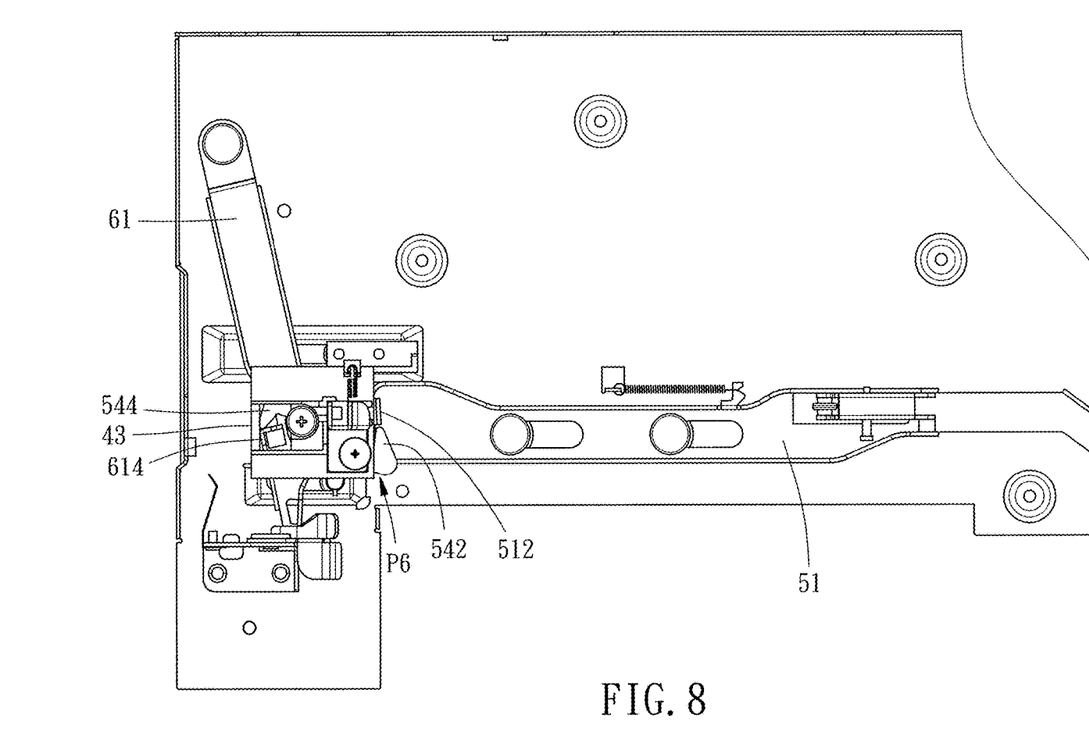
FIG. 8 is similar to FIG. 5, illustrating the horizontal displacement member in the end position and the pivot member in the engagement position without the presence of the connection unit.

As illustrated in FIG. 3, the pivot member 54 comprises a first hook portion 542 and a second hook portion 544 respectively located at two opposite ends thereof. Further, a screw 55 is inserted through a middle part of the pivot member 54 to make the pivot member 54 pivotally connect to the push-on seat 42 of the connection unit 40, allowing the pivot member 54 to rotate about the screw 55 between an engagement position P5 and a disengagement position P6. When the pivot member 54 is in the engagement position P5, as shown in FIG. 3, the first hook portion 542 of the pivot member 54 is engaged with the first upright wall 512 of the horizontal displacement member 51. On the contrary, when the pivot member 54 is in the disengagement position P6, as shown in FIG. 8, the first hook portion 542 of the pivot member 54 is released from the first upright wall 512 of the horizontal displacement member 51.

The second return spring 56 (see the tension spring shown in FIG. 3), having one end thereof connected to the push-on seat 42 of the connection unit 40 to face toward the first hook portion 542 of the pivot member 54 and an opposite end thereof connected to the pivot member 54 adjacent to the first hook portion 542. Thus, the second return spring 56 provides an elastic restoring force to rotate the pivot member 54 about the screw 55 toward the engagement position P5.

Figure 4:
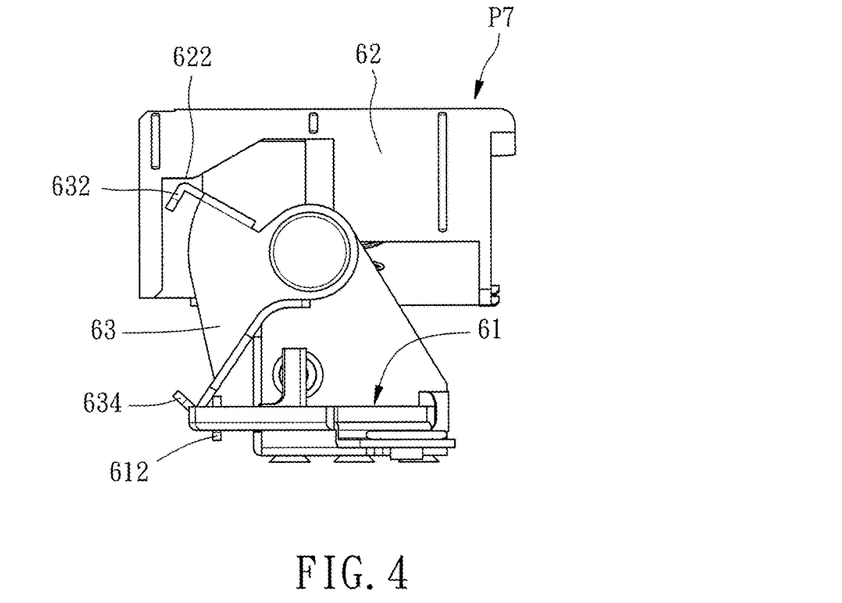
FIG. 4 is a plain view of the release unit, illustrating the button in the non-pressed position.

As illustrated in FIG. 2 to FIG. 4, the release unit 60 comprises a swing arm 61, a button 62 and a biasing member 63. The swing arm 61 has one end thereof pivotally connected to the base 20, and an opposite end thereof stopped against the push-on seat 42 and provided with a bearing portion 612. The swing arm 61 further has a second upright wall 614 adjacent to the bearing portion 612, and the swing arm 61 is engaged with the second hook portion 544 of the pivot member 54 by the second upright wall 614. The button 62 is mounted on the base 20 and can be moved downward by an external force from a non-pressed position P7 (see FIG. 4) to a pressed position P8 (see FIG. 7). Further, the button 62 has a protruding portion 622 located at a bottom thereof. The biasing member 63 is pivotally connected to the base 20, comprising a first extension portion 632 and a second extension portion 634. The biasing member 63 bears the protruding portion 622 of the button 62 via the first extension portion 632, and connects the bearing portion 612 of the swing arm 61 via the second extension portion 634. The release unit 60 further comprises a third return spring 64 (see the compression spring shown in FIG. 2). The third return spring 64 is mounted between the base 20 and the button 62 to provide an elastic restoring force that pushes the button 62 toward the non-pressed position P7.

Figure 5:
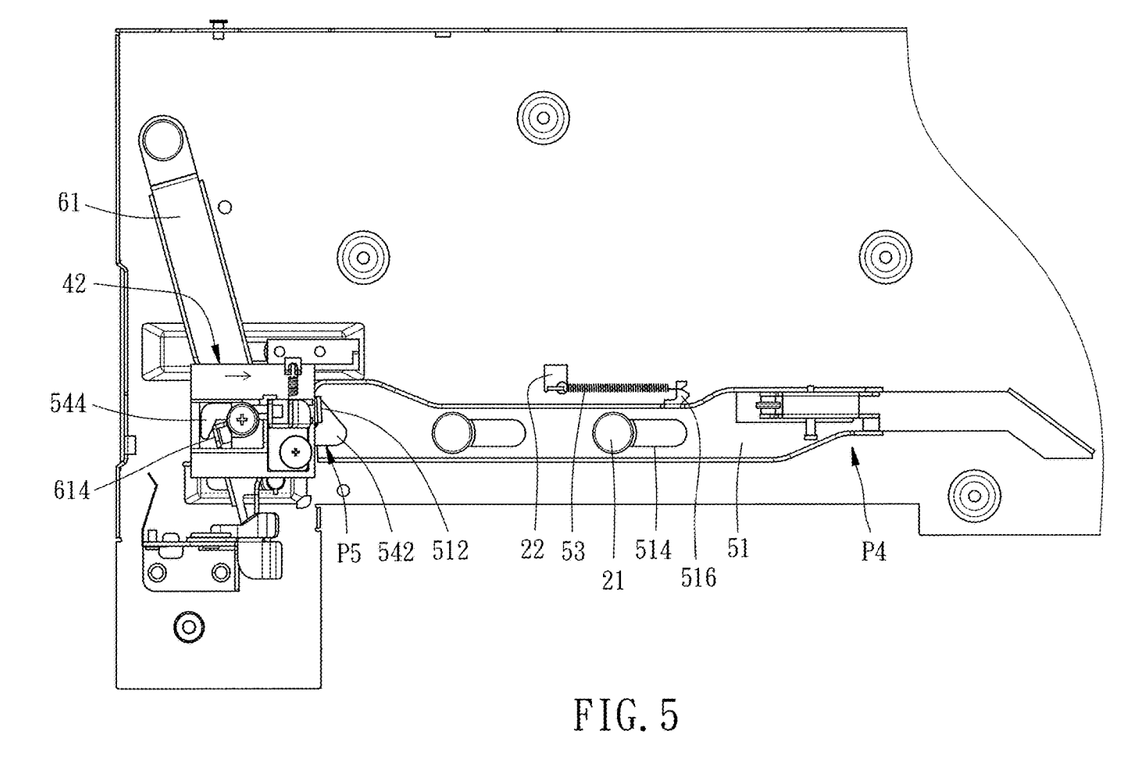
FIG. 5 is similar to FIG. 3, illustrating the horizontal displacement member in the end position without the presence of the connection terminal.
Figure 6:
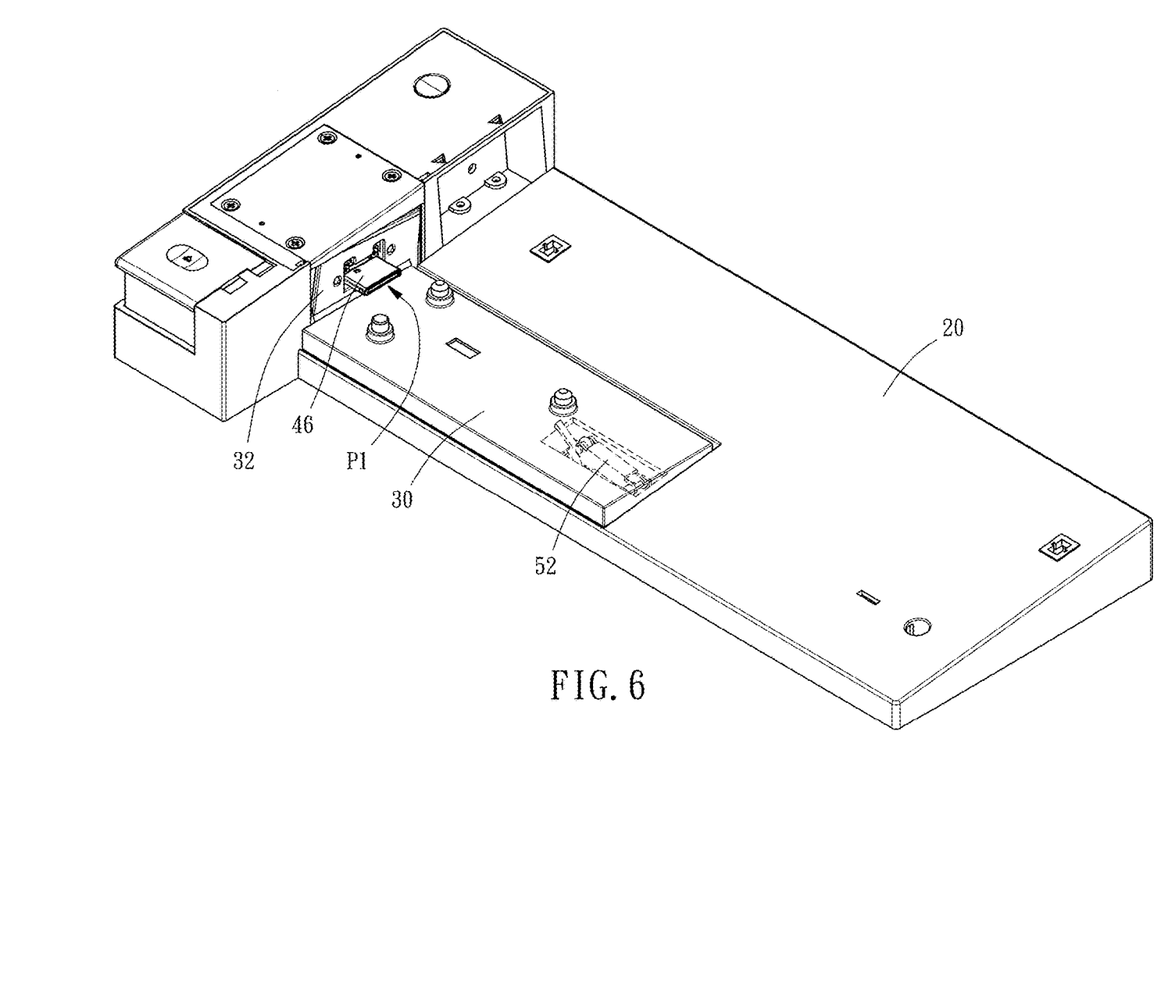
FIG. 6 is similar to FIG. 1, illustrating the connection unit in the connection position.

When a user places the mobile electronic device 2 on the floating cover 30, the floating cover 30 will be forced by the weight of the mobile electronic device 2 and the force from the user to move downward. During downward movement of the floating cover 30, the floating cover 30 will move the horizontal displacement member 51 from the initial position P3 shown in FIG. 3 to the end position P4 shown in FIG. 5 via the push rod 52. During the horizontal displacement of the horizontal displacement member 51, the pivot member 54 remains in the engagement position P5 shown in FIG. 3 and FIG. 5 (i.e., the first hook portion 542 of the pivot member 54 is engaged with the first upright all 512 of the horizontal displacement member 51) Thus, the pivot member 54 will move horizontally with the horizontal displacement member 51, when the pivot member 54 moves horizontally, as shown in FIG. 5. On one hand, the pivot member 54 carries the swing arm 61 to bias counterclockwise by means of the engagement relationship between the second hook portion 544 and the second upright wall 614 of the swing arm 61. On the other hand, the pivot member 54 carries the connection unit 40 from the release position P2 toward the connection position P1 subject to its pivot-connection relationship with the push-on seat 42, and thus, when the connection unit 40 reaches the connection position P1, as shown in FIG. 6, the connection terminal 46 is capable of being electrically connected to the mobile electronic device 2.

Figure 7:
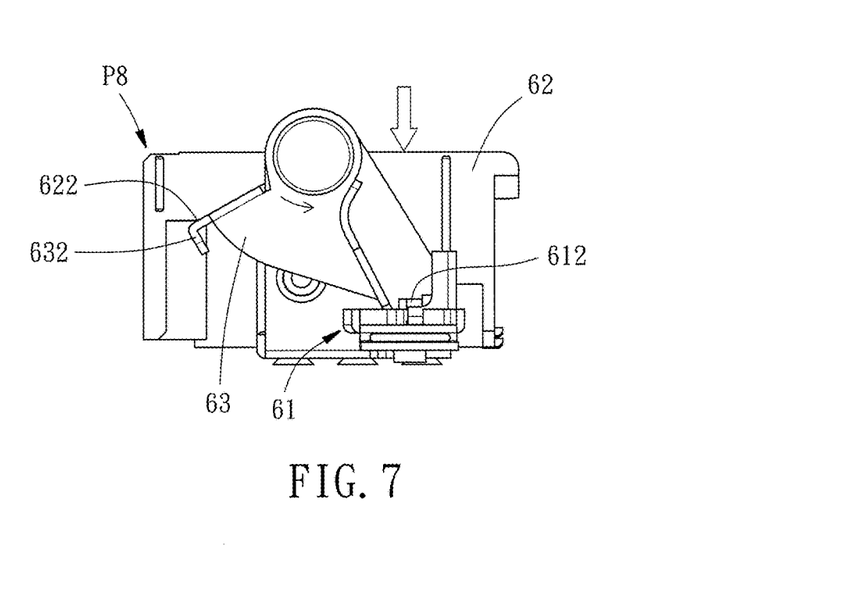
FIG. 7 is similar to FIG. 4, illustrating the button in the pressed position.
Figure 9:
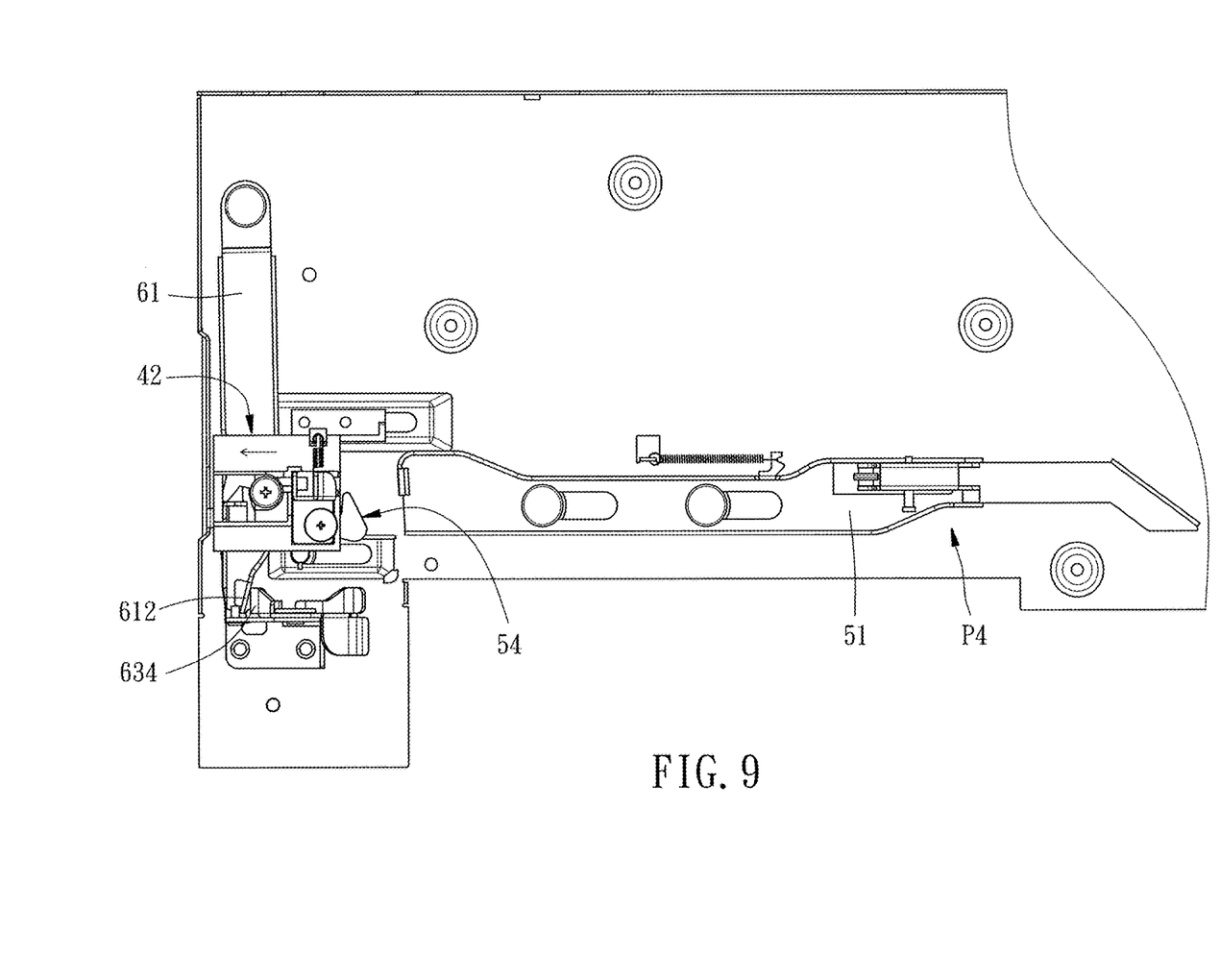
FIG. 9 is similar to FIG. 8, illustrating the push-on seat of the connection unit in the release position without the presence of the connection terminal.

When the user prepares to remove the mobile electronic device 2 from the docking station 10, the user pushes the button 62 to the pressed position P8, as shown in FIG. 7. At this time, the button 62 will push the first extension portion 632 of the biasing member 63 via the protruding portion 622, causing the biasing member 63 to bias. During biasing of the biasing member 63, the second extension portion 634 pushes the bearing portion 612 of the swing arm 61, causing the swing arm 61 to swing in a clockwise direction. During the swinging action of the swing arm 61, as shown in FIG. 8, the swing arm 61 moves the second hook portion 544 of the pivot member 54 via the second upright wall 614, causing the pivot member 54 to bias from the engagement position P5 shown in FIG. 5 to the disengaged position P6 shown in FIG. 8 (i.e. the first hook portion 542 of the pivot member 54 is separated and disengaged from the first upright wall 512 of the horizontal displacement member 51.) At the same time, the second hook portion 544 of the pivot member 54 is biased at an angle, enabling the second upright wall 614 of the swing arm 61 to touch a bearing portion 43 of the push-on seat 42. When the swing arm 61 keeps swinging and pushing the push-on seat 42 leftward, the connection unit 40 is forced back to the release position P2 shown in FIG. 1, releasing the connection relationship between the connection terminal 46 and the mobile electronic device 2. At this time, the mobile electronic device 2 is still kept on the floating cover 30, and thus, the horizontal displacement member 51 remains in the end position P4, as shown in FIG. 9.

Figure 10:
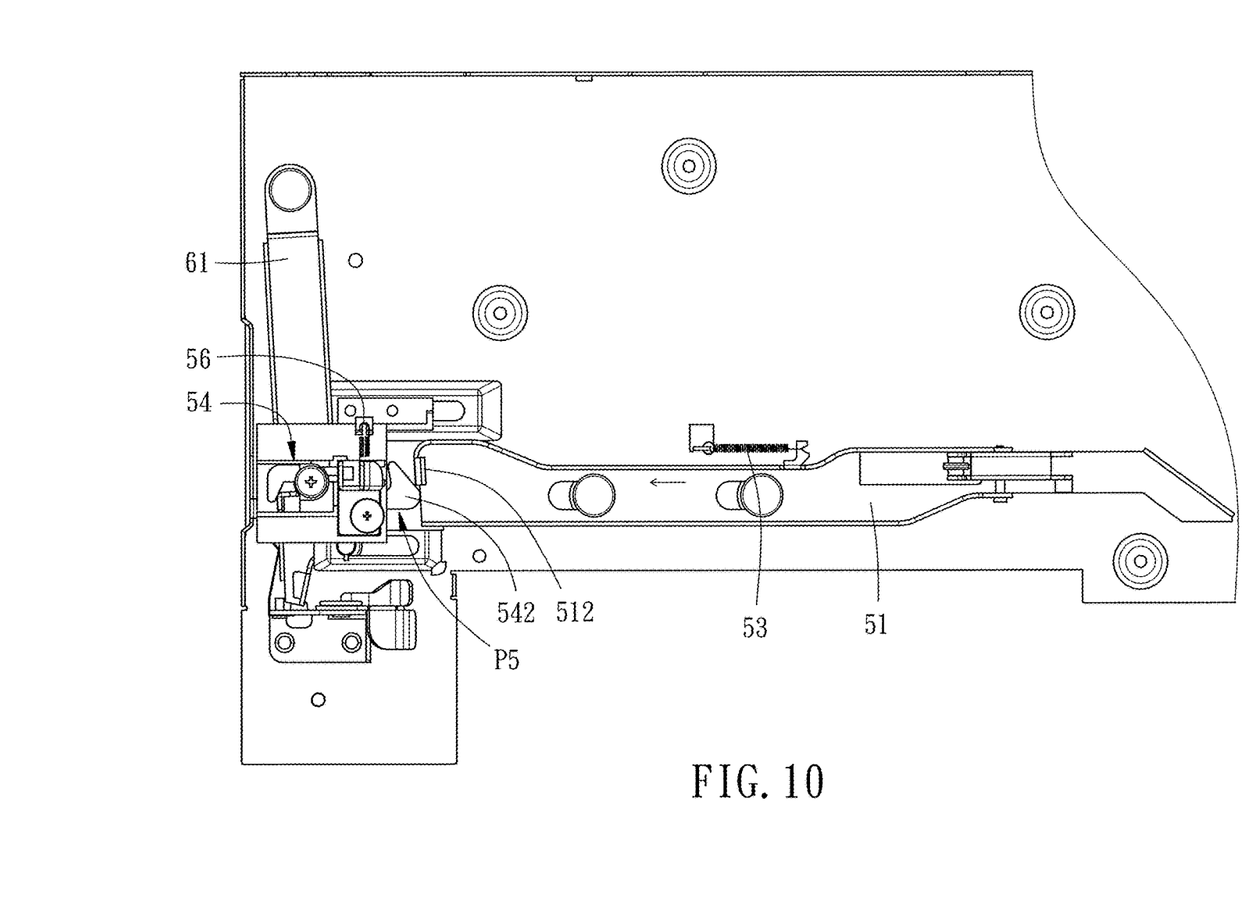
FIG. 10 is similar to FIG. 9, illustrating the first upright wall of the horizontal displacement member touching and pushing the first hook portion of the pivot member without the presence of the connection terminal.

Thereafter, release the pressure from the button 62, enable the button 62 to be pushed back to the non-pressed position P7 by the elastic restoring force of the third return spring 64, as shown in FIG. 4. At this time, the swing arm 61 releases its leftward pushing force from the push-on seat 42, and the pivot member 54 is pushed back to the engagement position P5 by the elastic restoring force of the second return spring 56, as shown in FIG. 10. Thereafter, remove the mobile electronic device 2 from the floating cover 30. After removal of the mobile electronic device 2 from the floating cover 30, the floating cover 30 returns to its previous position and releases the downward force toward the horizontal displacement member 51. At this time, the horizontal displacement member 51 is forced by the elastic restoring force of the first return spring 53 to move toward the pivot member 54. As the pivot member 54 is disposed in the engagement position P5 during movement of the horizontal displacement member 51, the first upright wall 512 of the horizontal displacement member 51 will touch and push the first hook portion 542 of the pivot member 54, causing the pivot member 54 to bias to the initial position P3 shown in FIG. 3. As soon as the pivot member 54 reaches the initial position P3, the first hook portion 542 of the pivot member 54 is engaged with the first upright wall 512 of the horizontal displacement member 51 again, and thus, the original state of use is restored.

In conclusion, when the user places the mobile electronic device 2 on the floating cover 30 of the docking station 10 and pushes the mobile electronic device 2 downwards, the connection unit 40 will be automatically connected to the mobile electronic device 2 to achieve signal connection. When the user wants to remove the mobile electronic device 2 from the docking station 10, the user simply needs to press the button 62. When the user presses the button 62, the connection unit 40 will be automatically disconnected from the mobile electronic device 2, allowing removal from the floating cover 30 of the docking station 10. Compared to the conventional art technique (i.e. push back the connection unit by hand first, place the mobile electronic device, and finally move the connection unit into connection with the mobile electronic device), the invention reduces the process of hand operation and makes the connection between the docking station and the mobile electronic device more user-friendly and ergonomically, achieving the purpose of enhancing the convenience of operation.

What is claimed is:

1. A docking station for a mobile electronic device, comprising:
    a base;
    a floating cover mounted on said base and movable up and down relative to said base;
    a connection unit horizontally movably mounted at said base and located at one lateral side relative to said floating cover;
    a transmission unit comprising a horizontal displacement member, a first return spring, a pivot member and a second return spring, said horizontal displacement member being horizontally movably mounted at said base and abutted against a bottom side of said floating cover and displaced horizontally by a downward force from said floating cover, said first return spring having two opposite ends thereof respectively connected to said base and said horizontal displacement member and adapted for providing an elastic restoring force to said horizontal displacement member, said pivot member being pivotally mounted at said connection unit and detachably engaged with said horizontal displacement member for carrying said connection unit to move upon displacement of said horizontal displacement member, said second return spring having two opposite ends thereof respectively connected to said connection unit and said pivot member and adapted for providing an elastic restoring force to said pivot member; and
    a release unit comprising a swing arm, a button and a third return spring, said swing arm being connected to said pivot member and having one end thereof pivotally coupled to said base, said button being mounted at said base and pressable by an external force to push said swing arm in moving and disengaging said pivot member away from said horizontal displacement member and carrying said connection unit in direction away from said horizontal displacement member, said third return spring being mounted between said base and said button and adapted for providing an elastic restoring force to said button.

2. The docking station as claimed in claim 1, wherein said horizontal displacement member comprises a first upright wall located at one end thereof; said pivot member comprises a first hook portion located at one end thereof and detachably engaged with said first upright wall of said horizontal displacement member.

3. The docking station as claimed in claim 1, wherein said swing arm comprises a second upright wall; said pivot member comprises a second hook portion located at one end thereof and engaged with said second upright wall of said swing arm.

4. The docking station as claimed in claim 1, wherein said swing arm has one end thereof pivotally mounted on said base and an opposite end thereof provided with a bearing portion; said button comprises a protruding portion located at a bottom side thereof; said release unit further comprises a biasing member pivotally mounted at said base; said biasing member comprises a first extension portion abutted against said protruding portion of said button and a second extension portion abutted against said bearing portion of said swing arm.

5. The docking station as claimed in claim 1, wherein said connection unit comprises a push-on seat movably mounted in said base, a terminal block having a bottom side thereof mounted on said push-on seat, and a connection terminal mounted at a top side of said terminal block; said pivot member has a middle part thereof pivotally connected to said push-on seat; said two ends of said second return spring are connected to said push-on seat and said pivot member respectively.

6. An operating method for disposing the docking station as claimed in claim 1, comprising the steps of:
    a) placing the mobile electronic device on said base;
    b) enabling said horizontal displacement member moving to an end position by said mobile electronic device; said horizontal displacement member carrying said connection unit to move to a connection position simultaneously via the engagement of said horizontal displacement member and said pivot member so that said connection unit can be electrically connected to said mobile electronic device, and said swing arm rotates with the moving of said connection unit;
    c) pressing said button to bias said swing arm toward said mobile electronic device and to simultaneously carry said pivot member and said connection unit, biasing said pivot member to a disengagement position where said horizontal displacement member is disengaged from said pivot member and moving said connection unit to a release position where said mobile electronic device is disconnected from said connection unit; and
    d) removing said mobile electronic device from said base for enabling said horizontal displacement member to move back to an original initial position and engage with said pivot member.

* * * * *